No. 839,512.  
PATENTED DEC. 25, 1906.  
W. E. ROBINSON.  
VARIABLE SPEED GEAR.  
APPLICATION FILED MAR. 12, 1906.

Witnesses:  
W. V. Redman  
C. E. Jordan

Inventor:  
William E. Robinson,  
By David N. Fletcher  
his Atty.

UNITED STATES PATENT OFFICE.

WILLIAM E. ROBINSON, OF SALEM, INDIANA.

VARIABLE-SPEED GEAR.

No. 839,512.        Specification of Letters Patent.        Patented Dec. 25, 1906.

Application filed March 12, 1906. Serial No. 305,655.

*To all whom it may concern:*

Be it known that I, WILLIAM E. ROBINSON, a citizen of the United States, residing at Salem, in the county of Washington and State of Indiana, have invented certain new and useful Improvements in Variable-Speed Gears, of which the following is a description, reference being had to the accompanying drawings, forming a part of this specification, in which corresponding reference-numerals in the different figures indicate like parts.

The object of my invention is to provide a transmission-gear which shall be so constructed and arranged that a variation of speed or a reversal of movement may be obtained while retaining the gears continuously in mesh.

To this end my invention consists in the combination of elements hereinafter more particularly described, and definitely pointed out in the claims.

Figure 1:
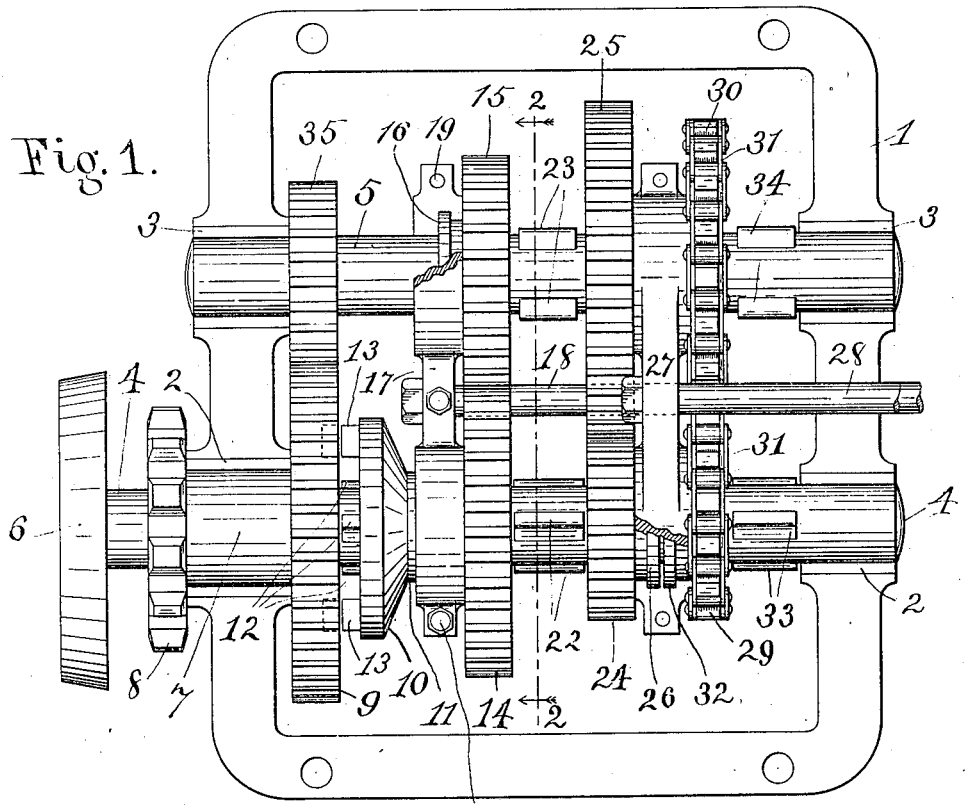
Figure 2:
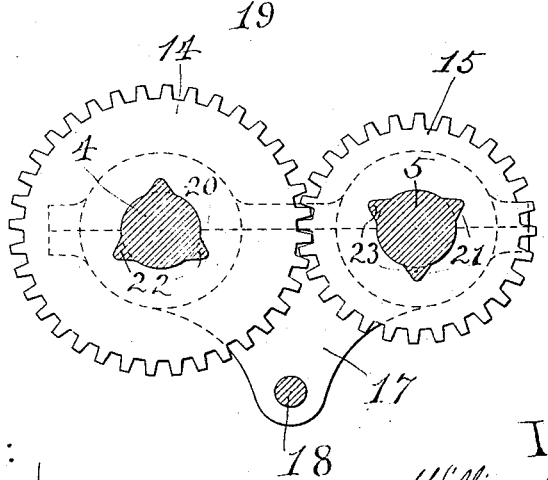

In the drawings, Figure 1 is a plan view of my improved device; and Fig. 2 is a vertical sectional view thereof, taken upon the line 2 2, Fig. 1, viewed in the direction of the arrow there shown.

Referring to the drawings, 1, Fig. 1, indicates a main frame in which is mounted in bearings 2 2 and 3 3, respectively, a main or transmission shaft 4 and a counter-shaft 5, arranged parallel thereto. The main shaft 4 is provided with the usual well-known friction clutch member 6, by which power may be transmitted thereto from any predetermined source. Mounted loosely upon the shaft 4 and interposed between it and the bearing 2 at one end of said shaft is a sleeve 7, which is integral with or rigidly attached to a sprocket-wheel 8 upon one end and to a gear-wheel 9 upon the other. A clutch member 10 has its hub 11 mounted upon the shaft, said hub having notches in the bore thereof (not shown) adapted to engage splines 12 upon the shaft 4, whereby said member may be caused to rotate, but is free to slide longitudinally. Projections 13 are formed upon the face of the clutch member to engage corresponding depressions (indicated in dotted lines) in the adjacent face of the gear 9.

Gear-wheels 14 15, (also shown in Fig. 2,) having flanged hubs, one of which is shown at 16, Fig. 1, are loosely mounted upon the shafts 4 and 5, respectively, said hubs being connected by means of a transverse yoke 17, chambered or grooved to receive the flanges of said hubs and loosely mounted thereon, so that the gears are free to rotate with the hubs within said chambers, while at the same time the lateral movement of the yoke, as hereinafter described, may serve to slide the gears upon their respective shafts while retaining them in mesh with each other. The hub of the clutch member 10 is formed with a flange thereon like the hub 16, which is fitted loosely within a corresponding groove in the yoke, so that the lateral movement of the yoke also serves to slide the clutch upon its shaft.

The yoke 17 is actuated by means of a rod 18, which in turn may be connected in any well-known way to an operating-lever. (Not shown.) Said yoke is made in two separable parts or halves bolted together at 19 19 to enable it to be fitted to the hubs. The bores of the gears 14 and 15 are notched, as shown at 20 21, Fig. 2, to enable them to engage splines 22 23 upon the shafts 4 and 5 in the manner and for the purpose hereinafter stated.

Gears 24 25, Fig. 1, are loosely mounted upon the shafts 4 and 5 and are in mesh with each other. Each of said gears is provided with a flanged hub, one of which is shown at 26, and over which is loosely fitted a yoke 27, bolted together in parts like the yoke 17. Said yoke is adapted to be moved laterally in like manner by means of a rod 28, connected with a lever or other actuating means. (Not shown.) Sprocket-wheels 29 30 are also loosely mounted, respectively, upon the shafts 4 and 5, said wheels being connected by means of a sprocket-chain 31. Each of said sprocket-wheels is provided with a flanged hub, one of which is shown at 32, which hubs are loosely fitted in grooves formed in the yoke 27. Splines 33 34 corresponding to the splines 22 23, are formed upon the shafts 4 and 5, respectively, at the right of said sprocket-wheels. The hubs of the gears 24 and 25 are notched to engage the splines 22 23 when said gears are caused to move laterally upon said shafts, and the hubs of the sprocket-wheels 29 and 30 are notched in like manner to receive the splines 33 34.

A gear 35, adapted to mesh with the gear 9, is keyed rigidly to the shaft 5, and hence would be caused to rotate constantly when the gear 9 is rotated through the action of the clutch 10; but inasmuch as all of the other gears, together with the sprocket-wheels 29 and 30, would be "out" or loose upon the shafts when the clutch is in engagement the rotation of the shaft 5 would not affect them.

The operation of said device is as follows: Assuming that a direct drive is wanted, the yoke 17 is moved laterally to the left through the action of the rod 18, controlled by its appropriate lever. This causes the clutch to engage the gear 9, and inasmuch as the power is received through the gear 6 and shaft 4 the engagement of the clutch causes it to be transferred, through the gear 9 and sleeve 7, to the sprocket-wheel 8, from whence it may be transmitted, by means of a sprocket-chain, to the desired point.

Should the lever connected with the rod 18 be actuated so as to move said rod to the right, the gears 14 and 15, which are proportioned for an intermediate speed, would be brought into engagement with the splines 22 and 23, and the power would then be transmitted from the shaft 4 through said gears to the shaft 5 and thence through the gears 35 and 9 to the wheel 8.

Should the lever controlling the rod 28 be moved so as to throw said rod to the left, the gears 24 and 25, which are proportioned for low speed, would then be caused to engage the splines 22 23, and the power would be transmitted through said last-named gears and the gears 35 and 9 at a minimum rate of speed. Should the yoke 27 be moved to the right through the action of the rod 28, the sprocket-wheels 29 and 30 would be caused to engage the splines 33 34, thereby transmitting said power through said wheels, sprocket-chain 31, and gears 35 and 9, but reversing the direction of motion.

While I prefer to employ the sprocket wheels and chain to cause the reverse, I do not wish to be confined thereto, as it is obvious that gears upon the respective shafts, with a suitable intermediate gear, may be employed with like results.

My improved device is applicable to any power-driven mechanism in which either a change of speed or a reverse action, or both, may be desirable. It is, however, especially intended for use upon automobiles.

From the foregoing it will be seen that the several sets of gears upon the shafts are always in mesh, and the disposition is such that shaft-splines are immediately adjacent thereto, which enables any predetermined set to be brought into action without causing the splines to pass through any of the others.

While I prefer to employ the spocket-wheel 8 or its equivalent, it is obvious that power may be transmitted directly from the gear 9 whether the clutch be employed or not.

In the construction of the device I prefer to make the splines upon the main shaft somewhat longer than those upon the counter-shaft, so that the gears upon the former may be thrown in first.

Having thus described my invention, I claim—

1. A variable-speed gear in which is combined a transmission-shaft, a counter-shaft, a sleeve loosely mounted upon said transmission-shaft, a gear upon said sleeve, a gear rigidly mounted upon said counter-shaft, said gear being in mesh with that upon said sleeve, a plurality of laterally-movable sets of gears loosely mounted upon said shafts, the members of each set being in continuous mesh with each other, splines upon said shaft adjacent to said gear sets, each gear of each set being provided with notches for engaging the splines adjacent thereto, means for shifting said sets laterally independently of each other, and means, in operative connection with said sleeve for transmitting power therefrom.

2. A variable-speed gear in which is combined a transmission-shaft, means for transmitting power thereto, a counter-shaft, a gear rigidly mounted thereon, a sleeve loosely mounted upon said transmission-shaft, a gear rigidly attached to said sleeve, means for transmitting power from said sleeve, a plurality of sets of gears mounted loosely upon said shafts, the gears of a given set being in permanent mesh with each other, one upon the transmission and the other upon the counter-shaft, the gears of different sets being adapted to cause varying speeds with respect to each other, yokes for each separate set of gears for moving the same laterally, each of said gears being provided with notches for the reception of splines, and splines upon said shafts adjacent to each set of gears, whereby the lateral movement of any given set from a normal position may cause the gears of a predetermined set to rotate and transmit power from the transmitting to the counter shaft and back to the sleeve upon the transmitting-shaft at varying speeds.

3. A variable-speed gear in which is combined parallel transmission and counter shafts, a plurality of sets of laterally-movable gears loosely mounted upon said shafts, one gear of each set being upon one and the other upon the opposite shaft while in permanent mesh with each other, means for shifting said sets laterally, each of said gears having notches for engagement with shaft-splines, splines upon each of said shafts adjacent to said gears, a gear rigidly mounted upon said counter-shaft and a gear loosely mounted upon said transmission-shaft in engagement with said last-named gear.

4. A variable-speed gear in which is combined parallel transmission and counter shafts, a plurality of sets of laterally-movable gears loosely mounted upon said shafts, the gears of each set being in permanent engagement, one of said gears being upon one and the other upon the opposite shaft, means for independently shifting said sets laterally, each of said gears having notches for the reception of the shaft-splines, splines upon each shaft adjacent to each set of gears, means for connecting the gears of one set so as to cause them to turn in the same direction, a gear rigidly mounted upon said counter-shaft and a gear loosely mounted upon said transmission-shaft in engagement with said rigidly-mounted gear.

5. A device of the class described in which is combined parallel transmission and counter shafts, a plurality of sets of laterally-movable gears loosely mounted upon said shafts, the gears of each set being in permanent engagement with each other, one of said gears being upon one and the other upon the opposite shaft, said sets being arranged to produce varying speeds with respect to each other, a pair of sprocket-wheels, one mounted upon each of said shafts, a sprocket-chain thereon, means for independently shifting said gear sets and sprocket-wheels laterally, each of said gears and wheels being notched to receive shaft-splines, shaft-splines upon said shafts adjacent to said gears and wheels, a gear rigidly mounted upon said counter-shaft and a coacting gear loosely mounted upon said transmission-shaft.

6. In a device of the class described, the combination of parallel transmission and counter shafts, a set of gears permanently in mesh loosely mounted upon said shafts, a set of reversing-gears loosely mounted upon said shafts, means for connecting the same, a yoke interposed between said sets for simultaneously moving them both laterally in one or another direction, said gears being provided with notches for engagement with shaft-splines, two sets of splines upon each of said shafts between which said gears and yoke are interposed, means for moving said yoke laterally in either direction, a gear rigidly mounted upon said counter-shaft and a coacting gear loosely mounted upon said transmission-shaft.

In testimony whereof I have signed this specification, in the presence of two subscribing witnesses, this 9th day of March, 1906.

WILLIAM E. ROBINSON.

Witnesses:
R. W. MARTINDALE,
THOMAS S. MARTIN.